Dec. 21, 1965  L. BECK  3,224,321
HEAT EXHAUST SUCTION DEVICE FOR OPAQUE PROJECTORS
Filed April 24, 1963  3 Sheets-Sheet 1
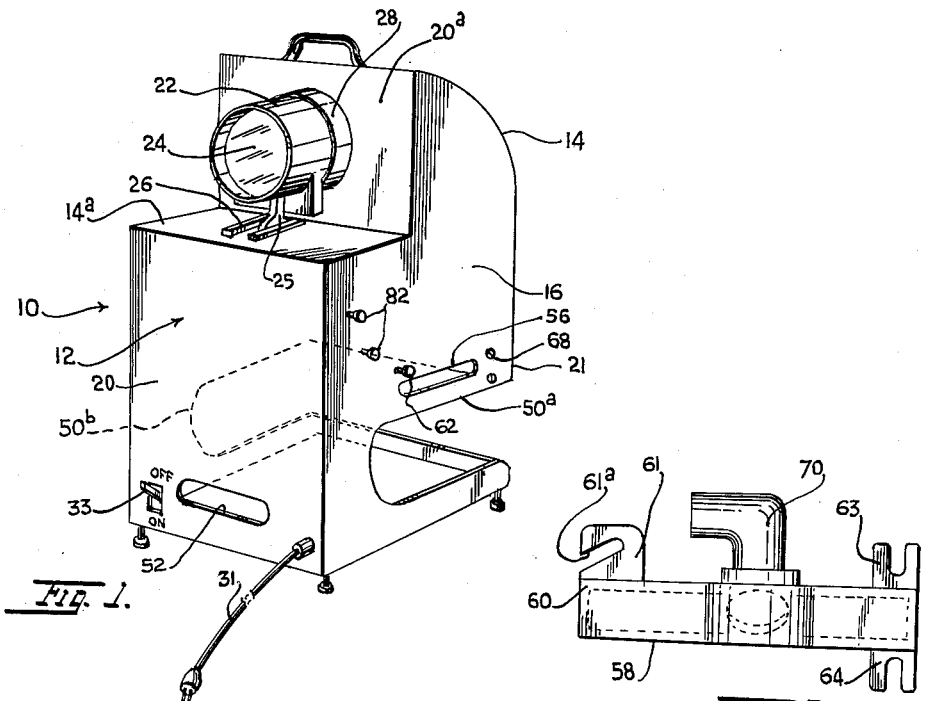
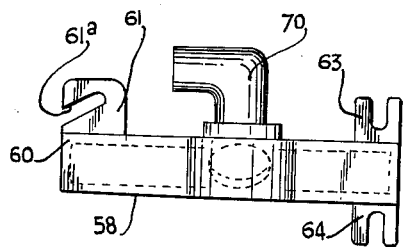
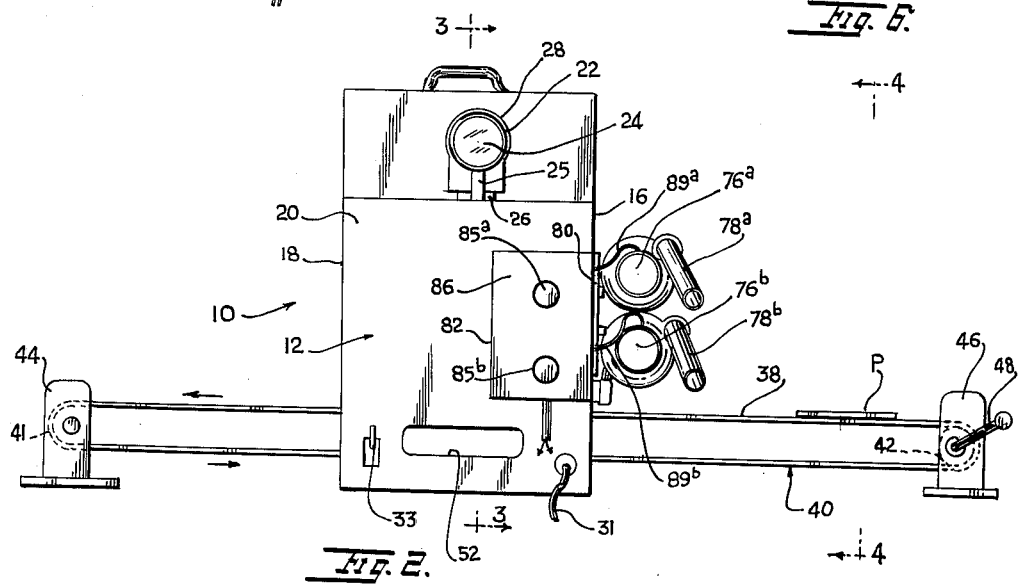
INVENTOR.
LUDWIG BECK
BY Polochek & Saulsbury
ATTORNEYS Dec. 21, 1965

L. BECK 3,224,321

HEAT EXHAUST SUCTION DEVICE FOR OPAQUE PROJECTORS

Filed April 24, 1963

INVENTOR.
LUDWIG BECK
BY
Flachek Hauksbury
ATTORNEY

Dec. 21, 1965     L. BECK     3,224,321
HEAT EXHAUST SUCTION DEVICE FOR OPAQUE PROJECTORS
Filed April 24, 1963     3 Sheets-Sheet 3

INVENTOR.
LUDWIG BECK
BY
*Polochek & Saulsbury*
ATTORNEYS

United States Patent Office 3,224,321
Patented Dec. 21, 1965

3,224,321
HEAT EXHAUST SUCTION DEVICE FOR
OPAQUE PROJECTORS
Ludwig Beck, 1530 2nd Ave., New York, N.Y.
Filed Apr. 24, 1963, Ser. No. 275,278
7 Claims. (Cl. 88—26)

This invention concerns a cooler attachment for an optical projector of the type which projects images of light reflecting articles located inside the projector.

Optical projectors of images of opaque articles such as photographs, drawings, and the like, conventionally employ very high intensity light sources such as 1000 watt lamps. Such lamps generate so much heat inside an optical projector that the photographs, drawings and the like are often physically damaged. The paper or plastic bases or coatings of the photographs may curl up or may become scorched or very brittle. It has been proposed heretofore to provide air blowers inside the projectors to cool the interiors thereof. Such expedients are undesirable since space is too limited inside the projectors to permit the mounting of blowers of necessary large size and capacity.

The present invention has as a principal object provision of a novel suction producing attachment for an optical projector which will draw a sufficient draft of cool air over an article such as a photograph being scanned in a projector, so that the article can be safely left in the projector for an extended period of time.

A further object is to provide a suction producing attachment including dual motor driven rotors connected to a common air inlet nozzle mountable upon a side of an optical projector.

Another object is to provide a suction producing attachment as described with a supplementary, associated adjustable nozzle for adjustably directing a cool air stream into an optical projector.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of an optical projector adapted for mounting a suction producing attachment thereon.

FIG. 2 is a front elevational view of the optical projector with suction producing attachment mounted thereon, and an associated conveyor belt for an article to be scanned in the projector.

FIG. 6 is a side elevational view on an enlarged scale of a suction nozzle.

Figure 3:
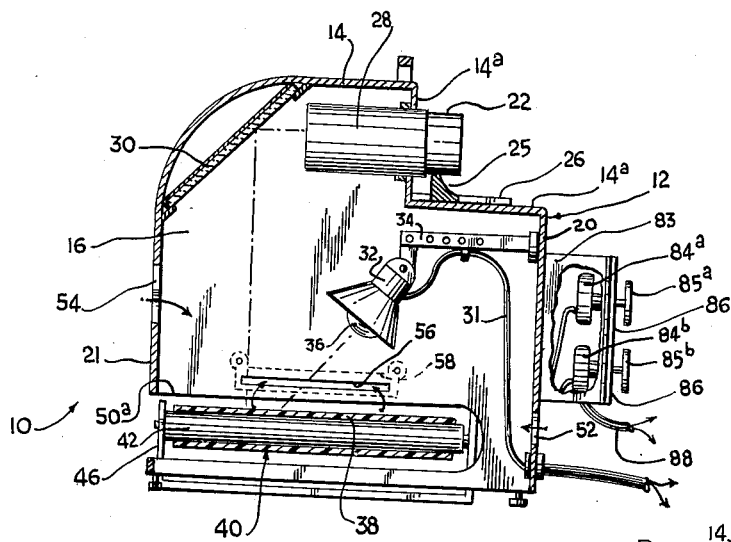
FIG. 3 is a vertical sectional view taken on line 3—3 of FIG. 2.
Figure 4:
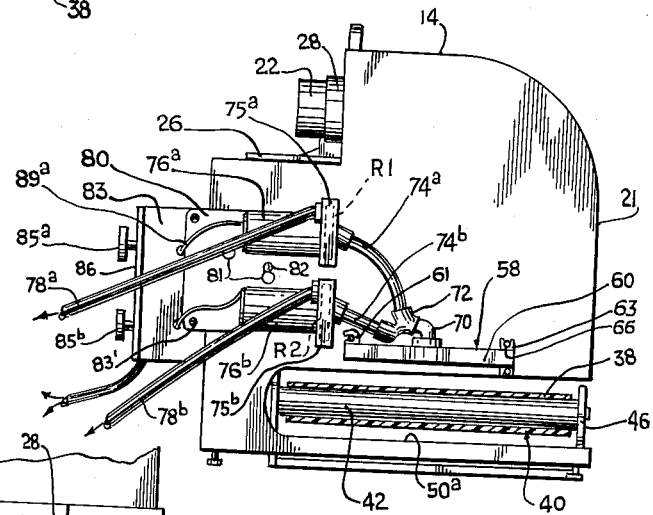
FIG. 4 is a side elevational view, partially in section, taken on line 4—4 of FIG. 2.
Figure 5:
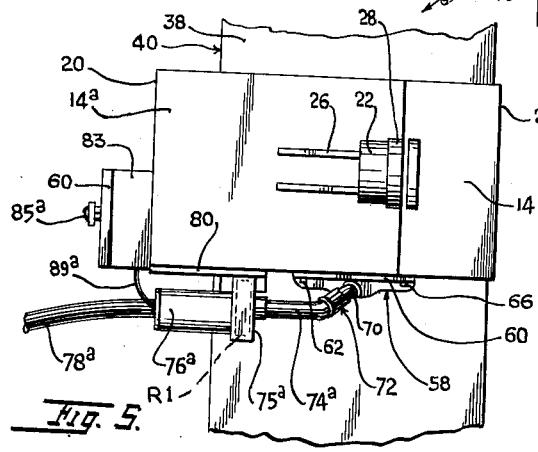
FIG. 5 is a top plan view of the optical projector and attachment, parts of the conveyor belt being removed.
Figure 7:
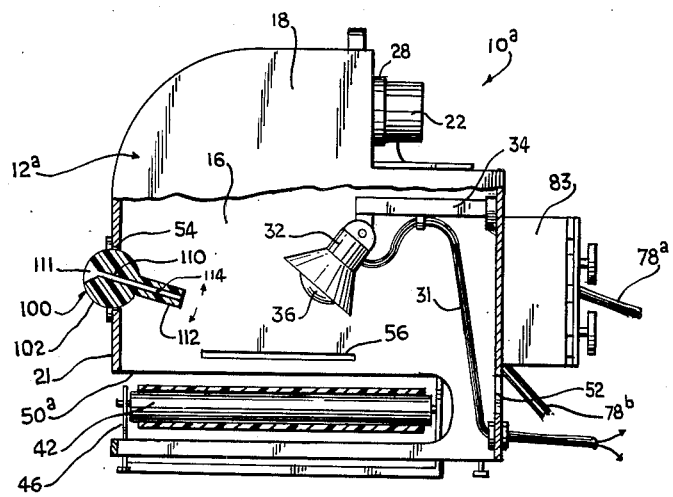
FIG. 7 is a sectional view similar to FIG. 3, of another projector embodying another form of the invention.
Figure 8:
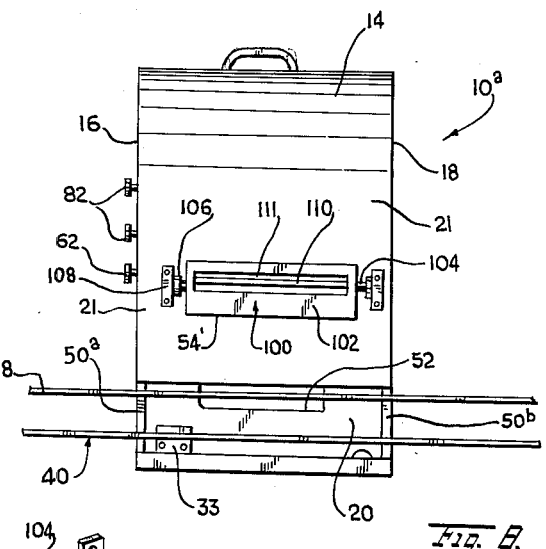
FIG. 8 is a rear view of the projector of FIG. 7, with suction attachment removed.
Figure 9:
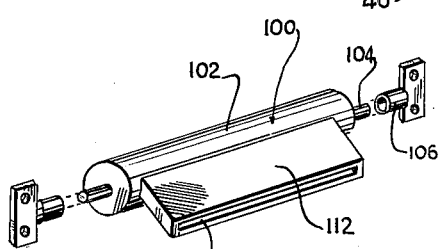
FIG. 9 is an exploded perspective view of an adjustable draft nozzle employed in the projector of FIGS. 7 and 8.

Referring first to FIGS. 1–5, there is shown an optical projector 10, including a generally rectangular casing 12 with an upper curved wall 14, flat parallel side walls 16, 18, front wall 20 and rear wall 21, and an open bottom. The front wall has a recessed section 20a on which is mounted a lens barrel 22 carrying a suitable projection lens system 24. The lens barrel is movable on an axially horizontal axis on a foot 25 between tracks 26 on a horizontal top wall section 14a. The lens barrel moves axially in a tube 28 secured to wall section 20a.

Inside the casing 12, as shown in FIG. 3, is a mirror 30 inclined to the axis of the lens system in barrel 22. A lamp fixture 32 is adjustably supported on a bracket 34 and carries a lamp bulb 36 for projecting an intense light upon a photograph or other light reflecting article to be scanned in the projector. The lamp is energized via a power cord 31 which is in circuit with an on-off switch 33 mounted on the front wall of the casing 12.

The article to be scanned may be horizontally supported upon the upper course 38 of a movable endless belt 40 carried on rollers 41, 42 supported on brackets 44, 46. Roller 42 can be turned by a crank 48 or an electric motor to advance article P into the projector for scanning. The mirror 30 receives light reflected from the article inside the projector casing on belt 40 and passes the light to the lens system for projection upon a suitable remotely located screen (not shown).

The belt 40 extends through and beyond openings 50a, 50b in the opposite sides 16, 18 of the casing 12 so that the article can be carried through the projector casing. Openings 52, 54 are provided in the front and rear walls respectively to admit fresh cool air into the casing 12. On side walls 16 is an elongated, rectangular opening 56 over which can be mounted suction nozzle 58.

The suction nozzle 58 has a frame plate 60 provided at one end with an upwardly extending ear 61 having an oblique slot 61a; see FIG. 6. This slot engages on a pin 62 extending outwardly of wall 16 near opening 56. Two other ears 63, 64 are provided at the other end of the frame plate and have slots 65 engaged by bolts 66 which are screwed into holes 68 in the side wall 16.

The nozzle has a rotatable angularly bent coupling 70 to which is connected the common inlet end 71 of a Y-type fitting 72. This fitting has two outlet branches connected to two flexible pipes 74a, 74b. The pipes 74a, 74b terminate at air inlet sides of two housings 75a, 75b in which are rotors R1, R2 driven by motors 76a, 76b. The rotors have vanes for driving air outwardly of the housings through air outlet pipes 78a, 78b. These pipes can terminate at a remote point far enough removed from the projector so that cool air drawn into the projector through apertures in the casing walls is not mixed with heated air discharged by the pipes 78a, 78b. The rotating rotors create and maintain a suction in the casing through the nozzle 58 so that cool air drawn into the casing through the openings in the side, rear and front walls passes over the top of the belt and warm heated air is withdrawn by the suction apparatus including the two motor driven rotors.

The motors 76a, 76b are mounted upon a flat rectangular plate 80 having holes 81 in which engage pins 82 mounted on the side wall 16. The plate 80 is removably mounted on the pins whose heads have diameters smaller than the bottoms of holes 81.

A rheostat box 83 is secured to plate 80 by screws 83'. In this box are two rheostats 84a, 84b respectively controlled by handles 85a, 85b extending through the cover 86 of the box, upon which the rheostats are mounted. The rheostats are connected to a common power cable 88 and are individually connected via wires 89a, 89b to motors 76a, 76b for independently energizing the motors and controlling their speed.

It will be apparent that a photograph or other article can be illuminated by the hot lamp bulb 36 inside the casing for a considerable period of time without damaging the article, because the heat of the lamp is drawn off in the heated air stream passing through the suction apparatus. Cool air flows into the casing through the openings in side, front and rear walls.

FIGS. 6–9 show another embodiment of the invention in which casing 12ᵃ of projector 10ᵃ has nozzle 100 in the form of a diametrally slotted drum 102 rotatably mounted in opening 54' in the rear wall 21 of the casing. The drum has axial stub shafts 104 which engage frictionally and rotatably in bearing sleeves 106 integral with bracket plates 108; see FIGS. 8 and 9. The drum has a diametral slot 110 provided with a flared end 111 opening at the exterior of the casing. The other end of the slot communicates with passage 114 in a wide flat nozzle tube 112 extending into the casing above belt 40.

The nozzle tube can be pointed in any desired direction by rotatably adjusting the position of the drum which is engaged frictionally in casing opening 54'. This insures that a draft of air will be directed upon the upper course 38 of the belt for supplying cool air thereto. Then when the air is heated by lamp bulb 36, the heated air will be drawn off by the suction apparatus which maintains adequate suction inside the casing.

The double rotor arrangement of the suction apparatus permits both rotors to be operated simultaneously and the two rheostats permit the motors to be relatively adjusted in speed for optimum suction conditions. If desired, one motor can be turned off while only the other motor and rotor operate. However, for most efficient operation, particularly over extended periods of time, both rotors should operate simultaneously at maximum speed.

There has thus been provided according to the invention, a means for drawing heated air away from a photograph, picture or other light reflecting article being scanned by an optical system in an optical projector. The article being scanned can remain stationary in the projector as long as necessary while the suction apparatus keeps it sufficiently air-cooled so that it is not deteriorated by the heat of the illuminating lamp.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letter Patent is:

1. A suction apparatus for drawing off heated air from the interior of a casing of an optical projector, comprising a nozzle attachable to a side of the casing in communication with the interior of the casing, said nozzle having a pivotable external coupling, a Y-type fitting having a common inlet connected to said coupling and having two outlet branches communicating with said inlet, pipes connected to the respective branches, rotor housings connected to the pipes respectively, air moving rotors in the housings having air inlet sides open to said pipes, air outlet pipes connected to air outlet sides of the housings, a plate, a pair of motors mounted on said plate and connected to and respectively driving said rotors, a power supply, and a pair of rheostats respectively in circuit with said power supply and said motors for independently controlling the speed of said motors, whereby air drawn from said casing into said nozzle passes through said housings and out of said air outlet pipes.

2. In an optical projector for a light reflecting article including a casing and a heat emitting light projecting lamp in the casing, a suction apparatus for keeping said article in a cool condition, comprising a nozzle attachable to a side of the casing in communication with the interior of the casing through an opening in said side, said nozzle having an external coupling, a Y-type pipe fitting having a common inlet connected to said coupling and two outlet branches communicating with said inlet, pipes connected to the respective branches, rotor housings connected to the pipes respectively, air moving rotors in the housings having air inlet sides open to said pipes respectively, air outlet pipes connected to air outlet sides of the housings, a plate, a pair of motors mounted on said plate and connected to and respectively driving said rotors, a power supply, and a pair of rheostats respectively in circuit with said power supply and said motors for independently controlling the speed of said motors, whereby air drawn from said casing into said nozzle passes through said housings and out of said air outlet pipes.

3. In an optical projector having a generally rectangular casing with opposing front, rear and side walls, and apertures in said walls for admitting air into the casing, the combination comprising an endless belt extending horizontally through apertures in the side walls for carrying an article to be subjected to light of a projection lamp through the casing, a nozzle attached to one side wall of the casing and communicating with the interior of the casing through another aperture in said side wall, said nozzle having an external coupling, a Y-type fitting having a common inlet connected to said coupling and having two outlet branches communicating with said inlet, pipes connected to the respective branches, rotor housings connected to the pipes respectively, air moving rotors in the housings having air inlet sides open to said pipes, air outlet pipes connected to air outlet sides of the housings, a plate, a pair of motors mounted on said plate and connected to and respectively driving said rotors, a power supply, and a pair of rheostats respectively in circuit with said power supply and said motors for independently controlling the speed of said motors, whereby air drawn from said casing into said nozzles passes through said housings and out of said air outlet pipes.

4. In an optical projector having a generally rectangular casing with opposing front, rear and side walls, and apertures in said walls for admitting air into the casing, the combination comprising an endless belt extending horizontally through apertures in the side walls for carrying an article to be subjected to light of a projection lamp through the casing, a nozzle attached to one side wall of the casing and communicating with the interior of the casing through another aperture in said side wall, said nozzle having an external coupling, a Y-type fitting having a common inlet connected to said coupling and having two outlet branches communicating with said inlet, pipes connected to the respective branches, rotor housings connected to the pipes respectively, air moving rotors in the housings having air inlet sides open to said pipes, air outlet pipes connected to air outlet sides of the housings, a plate, and a pair of motors mounted on said plate and connected to and respectively driving said rotors for driving air drawn from said casing into said nozzle through said housings and out of said air inlet pipes, another nozzle rotatably mounted in a further aperture in one of the walls other than said one side wall, said other nozzle having a flat air directing tube extending therefrom adjustably directing a stream of air into the casing onto said belt, said other nozzle and tube having a continuous passage extending from the exterior of the casing to the interior of the casing for passing cool air into the casing.

5. In an optical projector having a generally rectangular casing with opposing front, rear and side walls, and apertures in said walls for admitting air into the casing, the combination comprising an endless belt extending horizontally through apertures in the side walls for carrying an article to be subjected to light of a projection lamp through the casing, a nozzle attached to one side wall of the casing and communicating with the interior of the casing through another aperture in said side wall, said nozzle having an external coupling, a Y-type fitting having a common inlet connected to said coupling and having two outlet branches communicating with said inlet, pipes connected to the respective branches, rotor housings connected to the pipes respectively, air moving rotors in the housings having air inlet sides open to said pipes, air outlet pipes connected to air outlet sides of the housing, a plate, and a pair of motors mounted on said plate and connected to and respectively driving said rotors for driving air drawn from said casing into said nozzle through said housings and out of said air inlet pipes, another nozzle rotatably mounted in a further aperture in one of the walls other than said one side wall, said other nozzle having a flat air directing tube extending therefrom adjustably directing a stream of air into the casing onto said belt, said other nozzle and tube having a continuous passage extending from the exterior of the casing to the interior of the casing for passing cool air into the casing, a box secured to said plate, a pair of rheostats in said box, and a power supply, said rheostats being connected respectively in circuit with said motors and said power supply for independently controlling the speed of said motors.

6. In an optical projector having a generally rectangular casing with opposing front, rear and side walls, and apertures in said walls for admitting air into the casing, the combination comprising an endless belt extending horizontally through apertures in the side walls for carrying an article to be subjected to light of a projection lamp through the casing, a nozzle attached to one side wall of the casing and communicating with the interior of the casing through another aperture in said side wall, said nozzle having an external coupling, a Y-type fitting having a common inlet connected to said coupling and having two outlet branches communicating with said inlet, pipes connected to the respective branches, rotor housings connected to the pipes respectively, air moving rotors in the housings having air inlet sides open to said pipes, air outlet pipes connected to air outlet sides of the housings, a plate, a pair of motors mounted on said plate and connected to and respectively driving said rotors, a box mounted on said plate, a power supply cable terminating in said box, a pair of rheostats respectively in circuit with said power supply and said motors for independently controlling the speed of said motors, whereby air drawn from said casing into said nozzles passes through said housing and out of said air outlet pipes.

7. A suction apparatus for drawing off heated air from the interior of a casing of an optical projector, comprising a nozzle attachable to a side of the casing in communication with the interior of the casing, said nozzle having a pivotable external coupling, a Y-type fitting having a common inlet connected to said coupling and having two outlet branches communicating with said inlet, pipes connected to the respective branches, rotor housings connected to the pipes respectively, air moving rotors in the housings having air inlet sides open to said pipes, air outlet pipes connected to air outlet sides of the housings, a plate, a pair of motors mounted on said plate and connected to and respectively driving said rotors, a power supply, and a pair of rheostats respectively in circuit with said power supply and said motors for independently controlling the speed of said motors, whereby air drawn from said casing into said nozzle passes through said housings and out of said air outlet pipes, and a box mounted on said plate, said rheostats being disposed in said box and having control handles extending out of the box for independent adjustment of the rheostats.

References Cited by the Examiner
UNITED STATES PATENTS

| | | | |
|---|---|---|---|
| 2,300,475 | 11/1942 | Ward | 230—210 |
| 2,661,655 | 12/1953 | Field | 88—24 X |
| 2,849,915 | 9/1958 | Kennedy | 88—24 |

NORTON ANSHER, *Primary Examiner.*